US009088513B2

(12) United States Patent
Watanabe et al.

(10) Patent No.: US 9,088,513 B2
(45) Date of Patent: Jul. 21, 2015

(54) OUTPUT RATE CONTROLLER AND OUTPUT RATE CONTROL METHOD

(75) Inventors: Kazufumi Watanabe, Kanagawa (JP); Toshihisa Yajima, Kanagawa (JP)

(73) Assignee: NTT Electronics Corporation (JP)

( * ) Notice: Subject to any disclaimer, the term of this patent is extended or adjusted under 35 U.S.C. 154(b) by 139 days.

(21) Appl. No.: 13/704,257

(22) PCT Filed: May 30, 2011

(86) PCT No.: PCT/JP2011/062375
§ 371 (c)(1),
(2), (4) Date: Dec. 14, 2012

(87) PCT Pub. No.: WO2011/158640
PCT Pub. Date: Dec. 22, 2011

(65) Prior Publication Data
US 2013/0100811 A1    Apr. 25, 2013

(30) Foreign Application Priority Data

Jun. 14, 2010    (JP) .................................. 2010-135132

(51) Int. Cl.
*H04L 12/56*    (2006.01)
*H04L 12/801*    (2013.01)
(Continued)

(52) U.S. Cl.
CPC .............. *H04L 47/29* (2013.01); *H04N 21/647* (2013.01); *H04N 21/6437* (2013.01); *H04L 65/80* (2013.01)

(58) Field of Classification Search
CPC .... H04L 47/29; H04L 65/80; H04N 21/6437; H04N 21/647
USPC .......... 370/216, 241, 468, 235, 265; 369/53.15, 47.14; 725/109
See application file for complete search history.

(56) References Cited

U.S. PATENT DOCUMENTS 7,334,132 B1 *   2/2008  Kumar et al. ................. 713/189
2002/0027928 A1 *   3/2002  Fang ............................. 370/468
(Continued)

FOREIGN PATENT DOCUMENTS

JP    08-139704         5/1996
JP    2004-071045   *   3/2004  ............. G11B 20/10
(Continued)

OTHER PUBLICATIONS

International Search Report, PCT Application No. PCT/JP2011/062375, mailed Aug. 23, 2011.
(Continued)

*Primary Examiner* — Andrew Lai
*Assistant Examiner* — Mahmudul Hasan
(74) *Attorney, Agent, or Firm* — Kilpatrick Townsend & Stockton LLP

(57) ABSTRACT

An output rate controller has a TS packet buffer, a maximum value increase detector, a minimum value decrease detector and an output controller. The TS packet buffer accumulates input packets. The maximum value increase detector detects an increasing trend of the maximum number of packets being accumulated in the TS packet buffer within a fixed time period. The minimum value decrease detector detects a decreasing trend of the minimum number of packets being accumulated in the TS packet buffer within a fixed time period. The output controller sets a higher output rate of packets being accumulated in the TS packet buffer if an increasing trend has been detected by the maximum value increase detector, and sets a lower output rate of packets being accumulated in the TS packet buffer if a decreasing trend has been detected by the minimum value decrease detector.

8 Claims, 7 Drawing Sheets

(51) Int. Cl.
*H04N 21/6437* (2011.01)
*H04N 21/647* (2011.01)
*H04L 29/06* (2006.01)

(56) References Cited

U.S. PATENT DOCUMENTS

| | | | |
|---|---|---|---|
| 2002/0176512 A1* | 11/2002 | Tanaka et al. | 375/295 |
| 2004/0008736 A1* | 1/2004 | Bae et al. | 370/528 |
| 2004/0208135 A1* | 10/2004 | Nakamura et al. | 370/265 |
| 2004/0240355 A1* | 12/2004 | Honda | 369/53.15 |
| 2007/0076764 A1* | 4/2007 | Kawada et al. | 370/503 |
| 2007/0286245 A1* | 12/2007 | Yamada | 370/503 |
| 2008/0019398 A1* | 1/2008 | Genossar et al. | 370/498 |
| 2008/0137661 A1* | 6/2008 | Kwon et al. | 370/394 |
| 2009/0040997 A1* | 2/2009 | Oh et al. | 370/345 |
| 2009/0044072 A1* | 2/2009 | Oh et al. | 714/758 |
| 2009/0044230 A1* | 2/2009 | Oh et al. | 725/62 |
| 2010/0008385 A1* | 1/2010 | Noronha, Jr. | 370/545 |
| 2010/0232453 A1* | 9/2010 | Ohashi | 370/468 |
| 2010/0238792 A1* | 9/2010 | Togo | 370/216 |

FOREIGN PATENT DOCUMENTS

| | | | | |
|---|---|---|---|---|
| JP | 2004-071045 A | | 3/2004 | |
| JP | 2005-012753 | * | 1/2005 | H04L 1/00 |
| JP | 2005-012753 A | | 1/2005 | |
| JP | 2007-104085 | * | 4/2007 | H04N 7/173 |
| JP | 2007-104085 A | | 4/2007 | |
| JP | 2008-244704 | * | 10/2008 | H04H 20/02 |
| JP | 2008-244704 A | | 10/2008 | |

OTHER PUBLICATIONS

Office Action, Japanese Patent Application No. 2010-135132, mailed Nov. 13, 2012.

* cited by examiner

OUTPUT RATE CONTROLLER AND OUTPUT RATE CONTROL METHOD

This application is a national stage application of PCT/JP2011/062375 which claims priority to JP 2010-135132, both of which are incorporated herein by reference.

TECHNICAL FIELD

The present invention relates to an output rate controller and an output rate control method which control the output rate of input TS (Transport Stream) packets.

BACKGROUND ART

Video transmission of MPEG-2 is performed at a fixed rate in TS format. When TS packets are transmitted over an IP network, transmission delay fluctuation occurs in the network. For normal video transmission, it is required to transmit TS packets to a decoder with the time interval generated by an encoder being maintained. However, occurrence of the transmission delay fluctuation may result in failed decoding because intervals of TS packet arrival to the decoder become irregular, which may lead to disorder of audio video (AV) or AV synchronization error. Patent Literature 1 is a technical document as to absorbing the transmission delay fluctuation. Patent Literature 1 discloses a method of providing a buffer to absorb transmission delay fluctuation, monitoring the amount of buffer accumulation at a certain timing (sample time), and setting the output rate according to the accumulated amount.

CITATION LIST

Patent Literature

[PTL 1]
Japanese Patent Application Laid-Open Publication No. H08-139704

SUMMARY OF INVENTION

Technical Problem

However, with the control method disclosed in Patent Literature 1, the output rate drastically changes if the amount of buffer accumulation suddenly increases or decreases in a sample time. In such a case, the same state continues until the next sample time is reached and therefore the buffer may overflow or underflow.

In consideration of the prior art described above, the present invention is directed to provide an output rate controller and an output rate control method capable of handling a sudden change in the amount of buffer accumulation.

Solution to Problem

In order to achieve the above object, an invention according to a first aspect is an output rate controller that controls an output rate of inputted packets, including: a packet accumulator that accumulates inputted packets; a maximum value increase detector that detects an increasing trend of a maximum number of packets being accumulated in the packet accumulator within a fixed time period; a minimum value decrease detector that detects a decreasing trend of a minimum number of packets being accumulated in the packet accumulator within a fixed time period; and an output controller that sets a higher output rate of packets being accumulated in the packet accumulator if an increasing trend has been detected by the maximum value increase detector, and sets a lower output rate of packets being accumulated in the packet accumulator if a decreasing trend has been detected by the minimum value decrease detector.

An invention according to a second aspect is the invention according to the first aspect, further including, at a preceding stage of the packet accumulator, a NULL packet inserter that generates NULL packets if packet loss has occurred, and inserts the generated NULL packets in place of lost packets.

An invention according to a third aspect is the invention according to the first or second aspect, further including, an initial output rate calculator that calculates an initial output rate to be used in the output controller, based on the time difference between detecting two PCR values from a TS packet, and the number of TS packets received until the two PCR values are detected.

Additionally, in order to achieve the object described above, an invention according to a fourth aspect is an output rate control method that controls an output rate of inputted packets, including: a packet accumulating step that accumulates inputted packets in a packet accumulator; a maximum value increase detecting step that detects an increasing trend of a maximum number of packets being accumulated in the packet accumulator within a fixed time period; a minimum value decrease detecting step that detects a decreasing trend of a minimum number of packets being accumulated in the packet accumulator within a fixed time period; and an output controlling step that sets a higher output rate of packets being accumulated in the packet accumulator if an increasing trend has been detected in the maximum value increase detecting step, and sets a lower output rate of packets being accumulated in the packet accumulator if a decreasing trend has been detected in the minimum value decrease detecting step.

An invention according to a fifth aspect is the invention according to the fourth aspect, further including, at a preceding stage of the packet accumulating step, a NULL packet inserting step that generates NULL packets if packet loss has occurred, and inserts the generated NULL packets in place of lost packets.

An invention according to a sixth aspect is the invention according to the fourth or fifth aspect, further including an initial output rate calculating step that calculates an initial output rate to be used in the output controlling step, based on time difference between detecting two PCR values from a TS packet and the number of TS packets received until the two PCR values are detected.

Advantageous Effects of Invention

According to the present invention, an output rate controller and an output rate control method capable of handling a sudden change in the amount of buffer accumulation can be provided.

Figure 1:
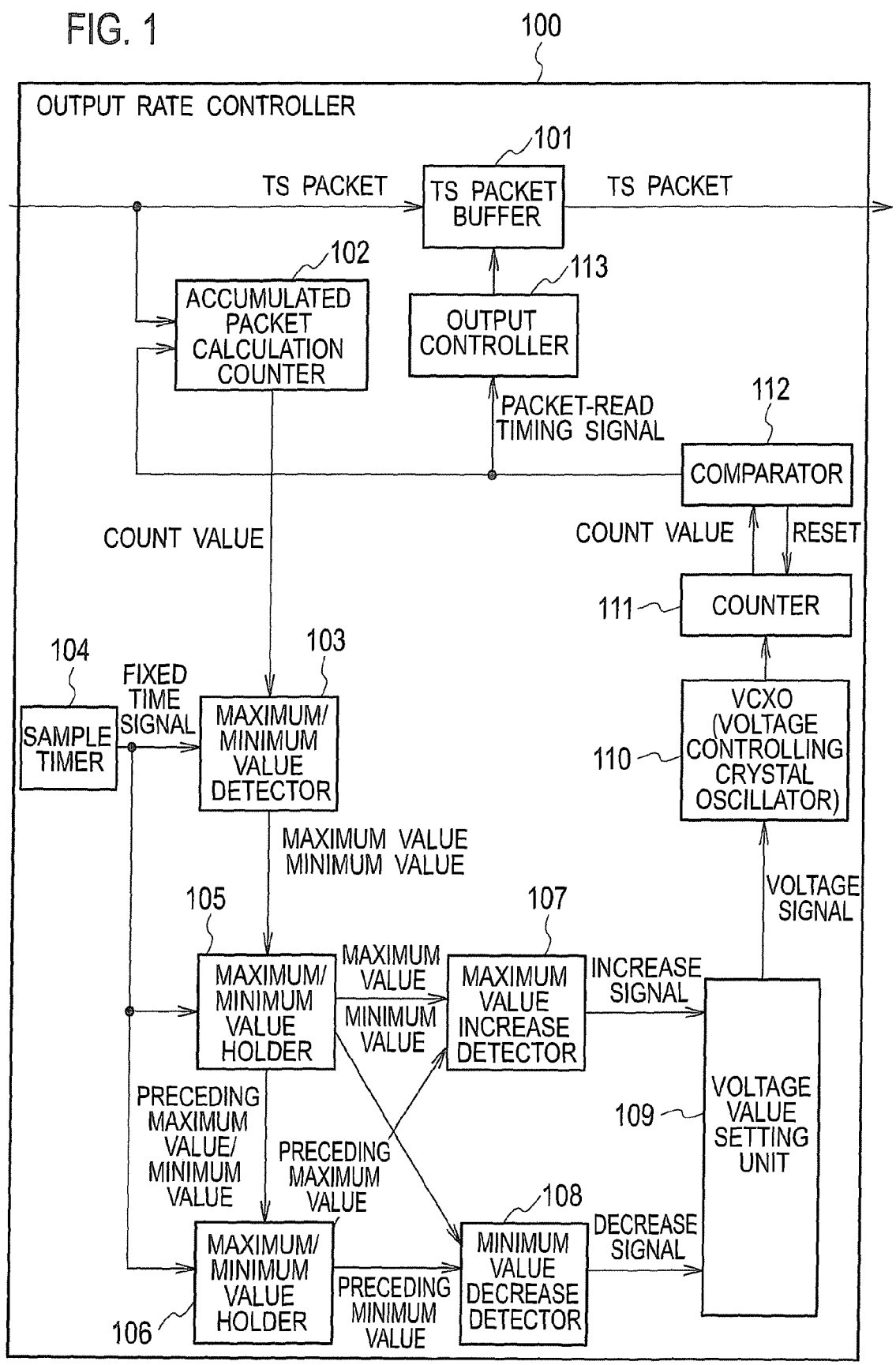
FIG. 1
It is a block diagram of an output rate controller in a first embodiment of the present invention.

It is a flow chart showing an operation of the initial output rate calculator in the second embodiment of the present invention.

FIG. 5

It is a block diagram of a switching timing generator in the second embodiment of the present invention.

FIG. 6

It is a flow chart showing an operation of the switching timing generator in the second embodiment of the present invention.

FIG. 7

It is a block diagram of a NULL packet inserter in a third embodiment of the present invention.

FIG. 8

It is a flow chart showing an operation of the NULL packet inserter in the third embodiment of the present invention.

FIG. 9

It is a block diagram of a main part of the output rate controller in the third embodiment of the present invention.

DESCRIPTION OF EMBODIMENTS

Embodiments of the present invention will be described in detail below, referring to the drawings.

First Embodiment

FIG. 1 is a block diagram of an output rate controller 100 in a first embodiment of the present invention. The output rate controller 100 is a device which absorbs delay fluctuation of TS packets which occur when TS packets are transmitted over a network, and outputs the TS packets to a decoder at a subsequent stage. As shown in FIG. 1, the output rate controller 100 includes a TS packet buffer 101, an accumulated packet calculation counter 102, a maximum/minimum value detector 103, a sample timer 104, maximum/minimum value holders 105 and 106, a maximum value increase detector 107, a minimum value decrease detector 108, a voltage value setting unit 109, a VCXO 110, a counter 111, a comparator 112, and an output controller 113.

The TS packet buffer 101 is a packet accumulator which accumulates input TS packets. The accumulated packet calculation counter 102 counts the number of accumulated TS packets. The maximum/minimum value detector 103 detects the maximum and the minimum count values within a fixed time period. The sample timer 104 sends out signals at fixed time intervals. The maximum/minimum value holder 105 holds the maximum and the minimum count values. The maximum/minimum value holder 106 holds the preceding maximum and the minimum count values. The maximum value increase detector 107 detects an increasing trend of the maximum number of packets being accumulated in the TS packet buffer 101 within a fixed time period. The minimum value decrease detector 108 detects a decreasing trend of the minimum number of packets being accumulated in the TS packet buffer 101 within a fixed time period. The voltage value setting unit 109 sets the control voltage of the VCXO 110. The VCXO 110 is a voltage controlling crystal oscillator which can adjust the frequency by changing the control voltage. The counter 111 performs the counting operation for each clock signal from the VCXO 110. The comparator 112 compares the count value of the counter 111 with a predetermined value N (described below). The output controller 113 sets a higher output rate of packets being accumulated in the TS packet buffer 101 if an increasing trend has been detected by the maximum value increase detector 107, and sets a lower output rate of packets being accumulated in the TS packet buffer 101 if a decreasing trend has been detected by the minimum value decrease detector 108.

Figure 2:
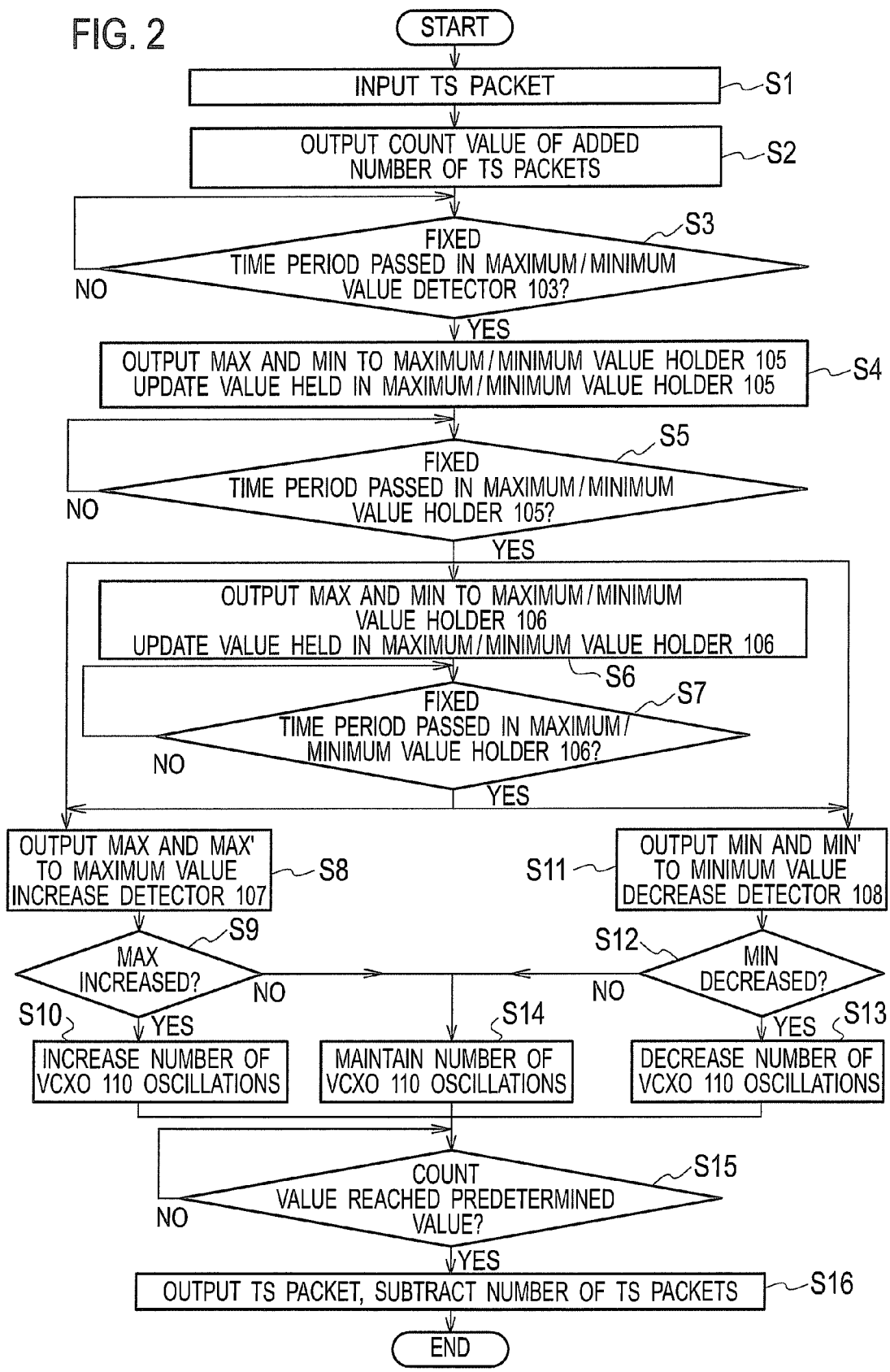
FIG. 2
It is a flow chart showing an operation of the output rate controller in the first embodiment of the present invention.

FIG. 2 is a flow chart showing an operation of the output rate controller 100 in the first embodiment of the present invention. The operation of the output rate controller 100 will be described below, referring to FIG. 2.

First, a TS packet which has been input to the output rate controller 100 is accumulated in the TS packet buffer 101 and also simultaneously input to an addition input terminal of the accumulated packet calculation counter 102 (S1). Accordingly, the accumulated packet calculation counter 102 counts the number of accumulated TS packets for each entry into the TS packet buffer 101, and outputs the count value to the maximum/minimum value detector 103 (S2).

The maximum/minimum value detector 103 detects the maximum and the minimum count values within a time period of the sample timer 104 which sends out signals at fixed time intervals (S3). Then, triggered by a signal being transmitted from the sample timer 104 at a fixed time interval, the maximum/minimum value detector 103 outputs the maximum and the minimum values to the maximum/minimum value holder 105, and simultaneously (S4) initializes the status for a subsequent detection.

The signal which has been transmitted from the sample timer 104 is output to the maximum/minimum value holders 105 and 106. At the timing of the signal from the sample timer 104, the maximum/minimum value holder 105 outputs the value currently held therein to the maximum/minimum value holder 106, and simultaneously updates the held value with an output value from the maximum/minimum value detector 103 (S4→S5). At the same timing, the maximum/minimum value holder 106 updates the held value with an output value from the maximum/minimum value holder 105 (S6→S7).

The maximum/minimum holder 105 outputs the maximum value (MAX) held therein to the maximum value increase detector 107, and outputs the minimum value (MIN) held therein to the minimum value decrease detector 108 (S8, S11). Similarly, the maximum/minimum value holder 106 outputs the preceding maximum value (MAX') held therein to the maximum value increase detector 107, and outputs the preceding minimum (MIN') held therein to the minimum value decrease detector 108 (S8, S11).

The maximum value increase detector 107 compares the maximum value (MAX) with the preceding maximum value (MAX') and, if MAX>MAX' is satisfied, determines that the maximum value shows an increasing trend (S9). Similarly, the minimum value decrease detector 108 compares the minimum value (MIN) with the preceding minimum value (MIN') and, if MIN<MIN' is satisfied, determines that the minimum value shows a decreasing trend (S12).

If it has been determined that the maximum value shows an increasing trend, the maximum value increase detector 107 outputs a voltage control signal instructing the voltage value setting unit 109 to raise the voltage. In addition, if it has been determined that the minimum value shows a decreasing trend, the minimum value decrease detector 108 outputs a voltage control signal instructing the voltage value setting unit 109 to lower the voltage. Here, if the maximum value shows an increasing trend and simultaneously the minimum shows a decreasing trend, in other words, if both MAX>MAX' and MIN<MIN' are satisfied, it suffices to preliminarily determine which one is given a higher priority than the other. In this occasion, it is assumed that the voltage control signals output from the maximum value increase detector 107 and the minimum value decrease detector 108 are respectively constant values. This is because when voltage control is performed according to the difference between MAX and MAX' or between MIN and MIN', a significant change in the buffer amount may cause a significant variation of the output rate. However, the time it takes to stabilize the output rate can be shortened by outputting a signal according to the difference, within a fixed time period from the start of control. As an example of a fixed time period used here, the time of the sample timer 104 can be employed during which increase of the maximum value and decrease of the minimum value do not occur simultaneously.

The voltage value setting unit 109 increases or decreases the voltage according to the voltage control signal output from the maximum value increase detector 107 or the minimum value decrease detector 108, and outputs it to the VCXO 110. The VCXO 110 oscillates according to the voltage signal from the voltage value setting unit 109 (S10, S13), the output of which is input to the counter 111.

The maximum value increase detector 107 compares the maximum value (MAX) with the preceding maximum value (MAX') and, if MAX≤MAX' is satisfied, outputs a voltage control signal instructing the voltage value setting unit 109 to maintain the present voltage. In addition, the minimum value decrease detector 108 compares the minimum value (MIN) with the preceding minimum value (MIN') and, if MIN≥MIN' is satisfied, outputs a voltage control signal instructing the voltage value setting unit 109 to maintain the present voltage. Here, if the maximum value shows an increasing trend and simultaneously the minimum value does not have a decreasing trend, in other words, if both MAX>MAX' and MIN≥MIN' are satisfied, it suffices to preliminarily determine which one is given a higher priority than the other. In addition, if the maximum value does not have a increasing trend and simultaneously the minimum value shows decreasing trend, in other words, if both MAX≤MAX' and MIN<MIN' are satisfied, it suffices to preliminarily determine which one is given a higher priority than the other.

If the maximum value increase detector 107 and/or the minimum value decrease detector 108 have output a voltage control signal instructing to maintain the present voltage, the voltage value setting unit 109 outputs the present voltage to the VCXO 110. The VCXO 110 oscillates according to the voltage signal from the voltage value setting unit 109 (S14), and the output of which is input to the counter 111.

The counter 111 performs a counting operation for each clock signal from the VCXO 110. The output of the counter 111 is input to the comparator 112. If the count value has reached a predetermined value N (described below) (S15), the comparator 112 outputs a packet-read timing signal, and outputs a reset signal to the counter 111. The counter 111 resets the count value to 0 upon entry of the reset signal. The packet-read timing signal which has been output from the comparator 112 is input to the output controller 113 and a subtraction input terminal of the accumulated packet calculation counter 102.

Upon receiving an input packet-read timing signal, the output controller 113 reads a single TS packet from the TS packet buffer 101 and outputs it (S16). Simultaneously, upon receiving an input packet-read timing signal, the accumulated packet calculation counter 102 subtracts a value of 1 from the count value held therein (S16).

A setting method of the count value N will be described. It is assumed that Lts is the byte length of a TS packet, Fe is the center frequency of the VCXO 110, and Rini is the initial output rate. Since a TS packet is output when the count value has reached N, the relation between the count value N and the initial output rate Rini becomes Rini=8×Lts×(Fe/N). Therefore, a calculation is performed such as N=(Fe/Rini)8×Lts.

According to the output rate controller 100 in the first embodiment of the present invention as described above, it is possible to handle a sudden change in the amount of buffer accumulation, by calculating the maximum value and the minimum value of the amount of buffer accumulation in a fixed time period and the maximum value and the minimum value of the amount of buffer accumulation in the next time period, and calculating the difference between the maximum values and the difference between the minimum values; and subsequently by setting a higher output rate if the maximum value shows an increasing trend, and setting a lower output rate if the minimum value shows a decreasing trend.

Second Embodiment

Although it is assumed in Patent Literature 1 that a value expected along the transmission path is set as the output rate at the start of control, the method has not been clarified. Accordingly, the predicted output rate may significantly differ from the actual value (bit rate) along the transmission path. Therefore, since the buffer enters an overflow state if the predicted output rate is lower than the actual bit rate, the TS data supposed to be output to the decoder drops out, which prevents normal decoding process. In contrast, since the buffer enters an underflow state if the predicted output rate is higher than the actual bit rate, there is a risk that the TS data cannot be output at the timing when the decoder performs the process, which may lead to occurrence of failure such as synchronization error between video and audio or display disturbance.

Figure 3:
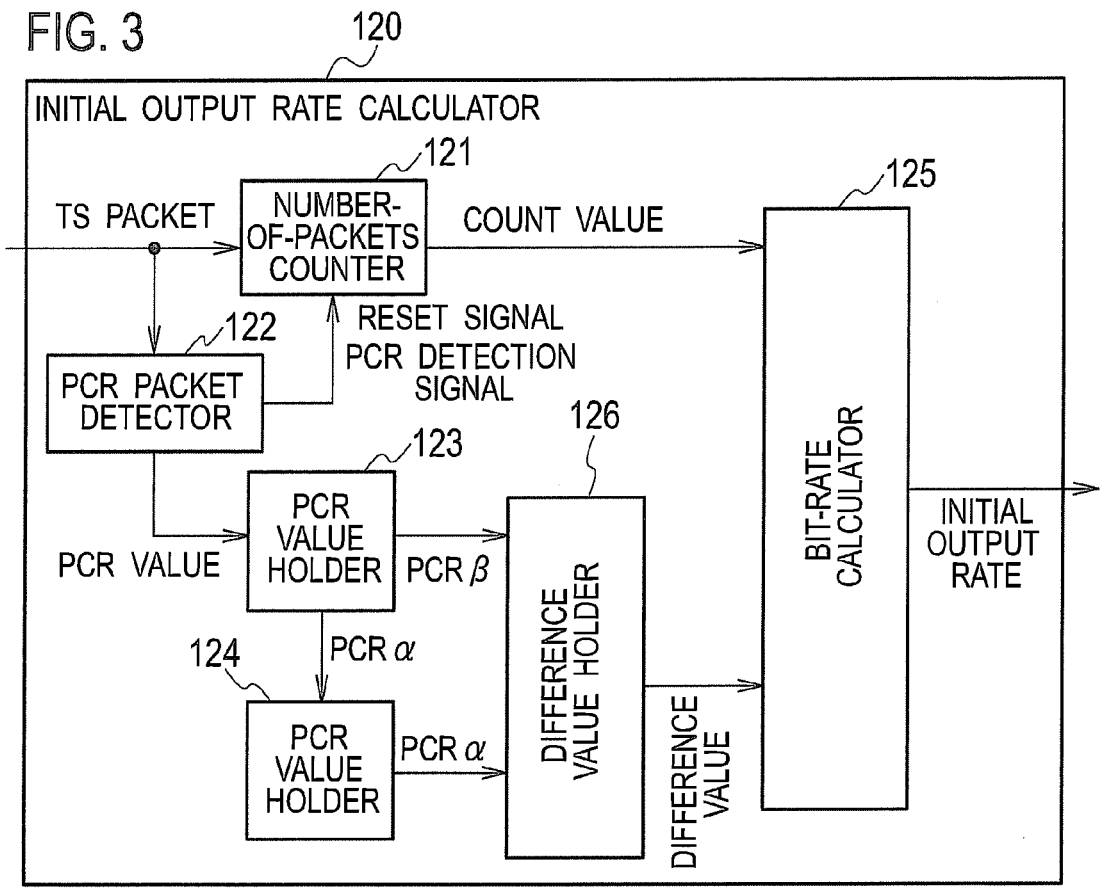
FIG. 3
It is a block diagram of an initial output rate calculator in a second embodiment of the present invention.

Therefore, in order to obtain a stable output rate from the start of control, the output rate controller 100 of the present embodiment has an initial output rate calculator 120 which calculates an initial output rate used in the output controller 113, based on the time difference between detecting two PCR values from a TS packet and the number of TS packets received until the two PCR values are detected, as shown in FIG. 3. A PCR value is a standard clock when performing time synchronization between the transmitting side and the receiving side. A PCR value is included in a TS packet at a fixed time interval. Since it is expected that values calculated by the initial output rate calculator 120 may slightly vary for each calculation depending on the operation condition of the transmitting side, values are obtained by calculating it a predefined times and the maximum value of which is used as the output rate at the start of control.

Figure 4:
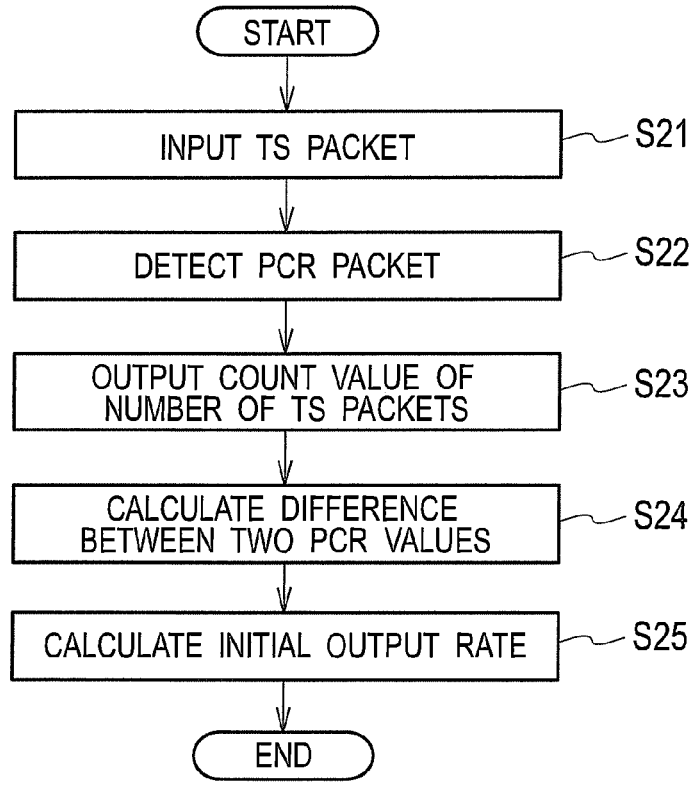
FIG. 4

FIG. 4 is a flow chart showing an operation of the initial output rate calculator 120 in the second embodiment of the present invention. The operation of the initial output rate calculator 120 will be described below, referring to FIG. 4.

First, a TS packet received from a network is input to the TS packet buffer 101 and the accumulated packet calculation counter 102 and also simultaneously input to the initial output rate calculator 120 (S21). The TS packet input to the initial output rate calculator 120 is input to a number-of-packets counter 121 and a PCR packet detector 122.

The PCR packet detector 122 detects a PCR packet from the TS packet (S22). If a PCR packet is detected, the PCR packet detector 122 outputs a PCR detection signal to the number-of-packets counter 121, and outputs the PCR value in the PCR packet to a PCR value holder 123.

The number-of-packets counter 121 counts the number of TS packets and, if a PCR detection signal is received, outputs the count value to a bit-rate calculator 125 (S23). Accordingly, it is known how many TS packets exist between two PCRs. The number-of-packets counter 121 which has output the count value resets the count value, and continues counting of TS packets being input.

The PCR value holder 123 receives an input PCR value (PCRα) from the PCR packet detector 122 and holds it until a next PCR value (PCRβ) is input. If the next PCR value (PCRβ) has been input, the PCR value (PCRα) held therein is output to a PCR value holder 124. The PCR value holder 123 and the PCR value holder 124 output the PCR values (PCRα and PCRβ) held therein to a difference value holder 126. The difference value holder 126 calculates a difference value Δt between PCRα and PCR (S24). Accordingly, the time difference between two PCRs is known. The calculated difference value Δt is output to the bit-rate calculator 125.

The bit-rate calculator 125 calculates an initial output rate from the count number input from the number-of-packets counter 121 and the difference value Δt input from the difference value holder 126 (S25). The method of calculating the initial output rate divides the amount of data of TS packets obtained from the count value by the difference value Δt. For example, counting of a TS packet having a data length of 100 units of 188 bytes between two PCRs (e.g., 100 ms) gives 100×188×8/100=1.504 Mbit/s. Setting this bit rate in the output controller 113 as the initial output rate can provide an output rate which is stable from the start of control. Subsequently, after a predetermined time period has passed, it switches to the output rate control of FIG. 1 (output rate control described in the first embodiment).

Figure 5:
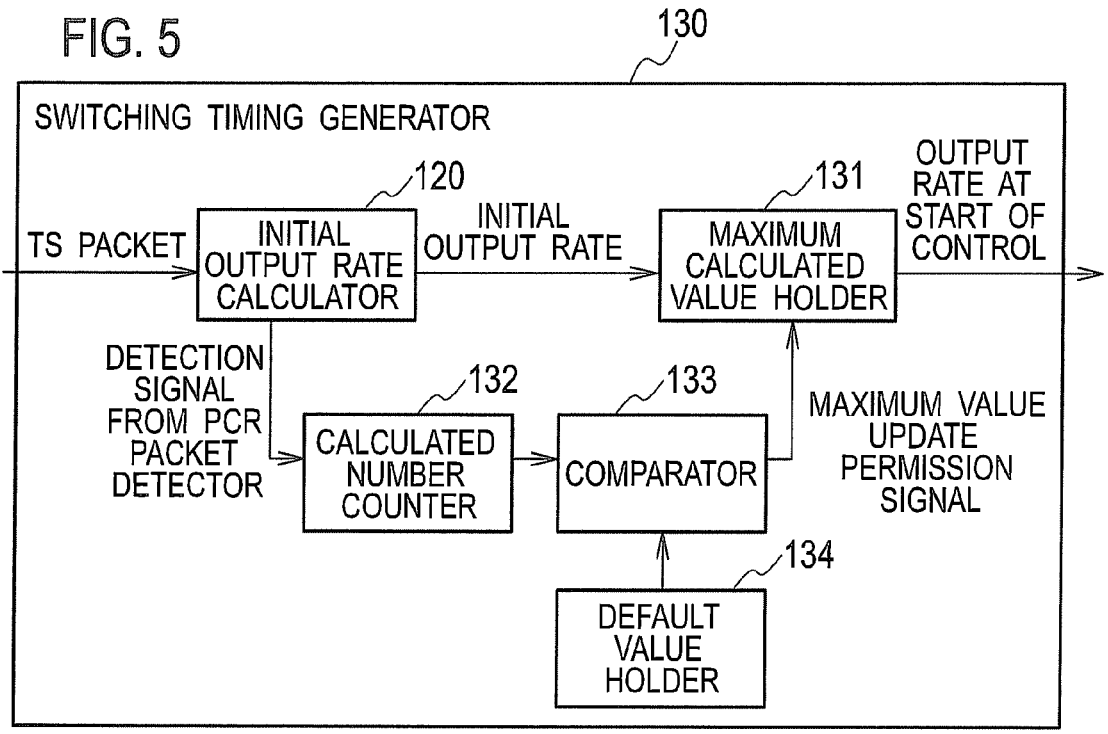
Figure 6:
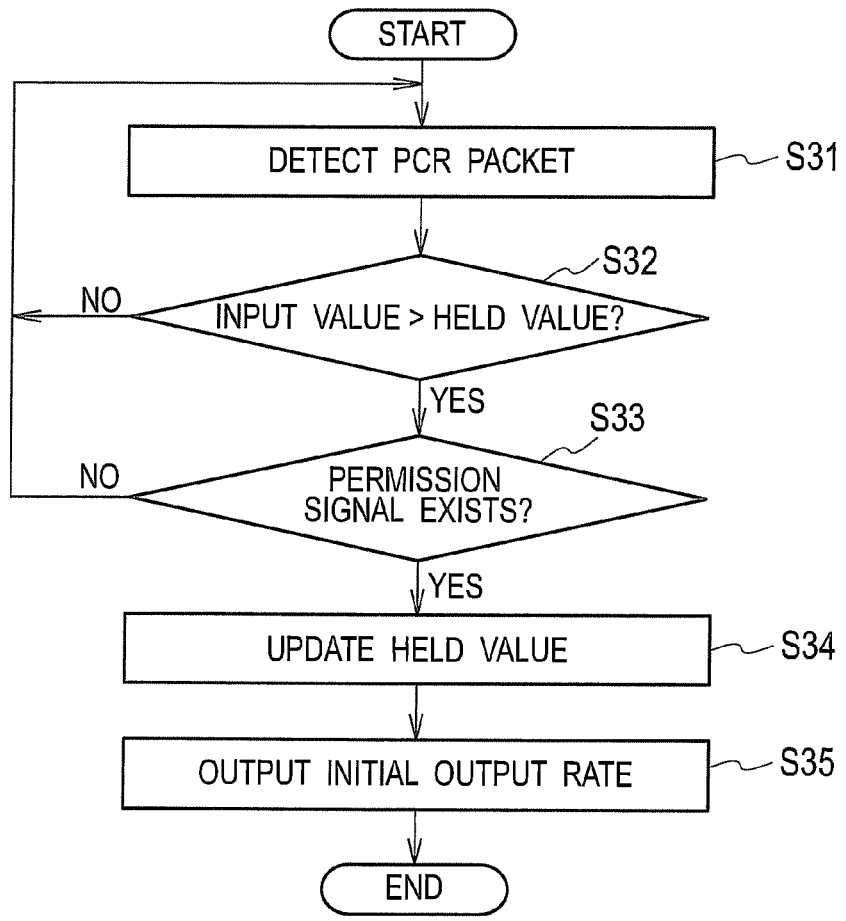

Next, a process of switching from the initial output rate control of FIG. 3 to the output rate control of FIG. 1 will be described. Here, the initial output rate calculator 120, a maximum calculated value holder 131, a calculated number counter 132, a comparator 133, and a default value holder 134 will be collectively referred to as a "switching timing generator 130", as shown in FIG. 5. The configuration as well as the operation of the switching timing generator 130 will be described below, referring to FIG. 6.

First, the output value (initial output rate) of the initial output rate calculator 120 is output to and held in the maximum calculated value holder 131. In addition, the detection signal output from the PCR packet detector 122 of the initial output rate calculator 120 is input to the calculated number counter 132. It is assumed that the values of the maximum calculated value holder 131 and the calculated number counter 132 have been initialized to 0. The value of the calculated number counter 132 is incremented and input to the comparator 133 for each detection signal, and compared with a default value held in the default value holder 134. If the value of the calculated number counter 132 is less than the default value, the comparator 133 outputs a maximum value update permission signal to the maximum calculated value holder 131.

The maximum calculated value holder 131 compares a value (initial output rate) which is newly input each time a PCR packet is detected with the currently held value. This comparison is performed at each timing when a PCR packet is detected (S31). Here, if the newly input value is larger than the currently held value, and if a maximum value update permission signal has been input, the currently held value is rewritten with the newly input value and is output as the initial output rate (S32→S33→S34→S35).

Rewriting in the maximum calculated value holder 131 is performed until the calculated number counter 132 reaches a default value, and rewriting is not performed after the default value has been reached. At the timing of termination of the rewriting, the control is switched from the initial output rate control of FIG. 3 to the output rate control of FIG. 1. In this occasion, the predetermined value N used for comparison by the comparator 112 is calculated by substituting the output rate at the start of control which is output from the maximum calculated value holder 131 to the initial output rate Rini of the formula N=(Fe/Rini)8×Lts described above.

As has been described above, since the output rate at the start of control can be obtained with a high precision from the number of TS packets between two PCR values in the received TS data, according to the output rate controller 100 in the second embodiment of the present invention, a stable output rate can be obtained from the start of control.

Third Embodiment

If there is packet loss during network transmission, since the amount of buffer accumulation significantly decreases, the output rate also significantly decreases until the amount of buffer accumulation becomes a constant value. In this case, a gap in the packet reception timing of the decoder may cause decoding failure such as audio/video (AV) disturbance or synchronization error between video and audio.

Figure 7:
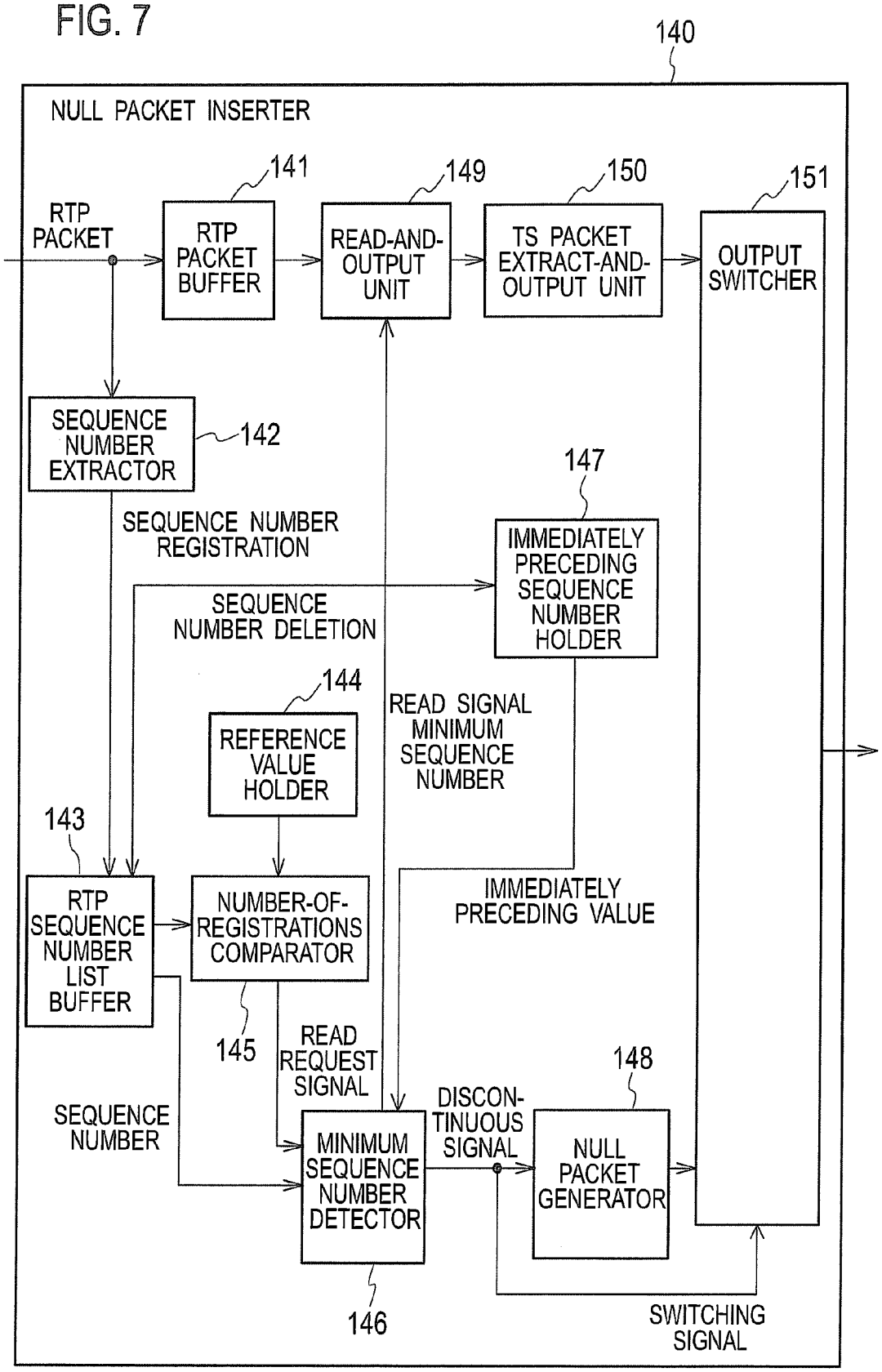

Therefore, in order to prevent such decoding failure, the output rate controller 100 of the present embodiment is provided with, at a preceding stage of the TS packet buffer 101, a NULL packet inserter 140 which generates a NULL packet if packet loss has occurred and inserts the generated NULL packet in place of the lost packet, as shown in FIG. 7.

Figure 8:
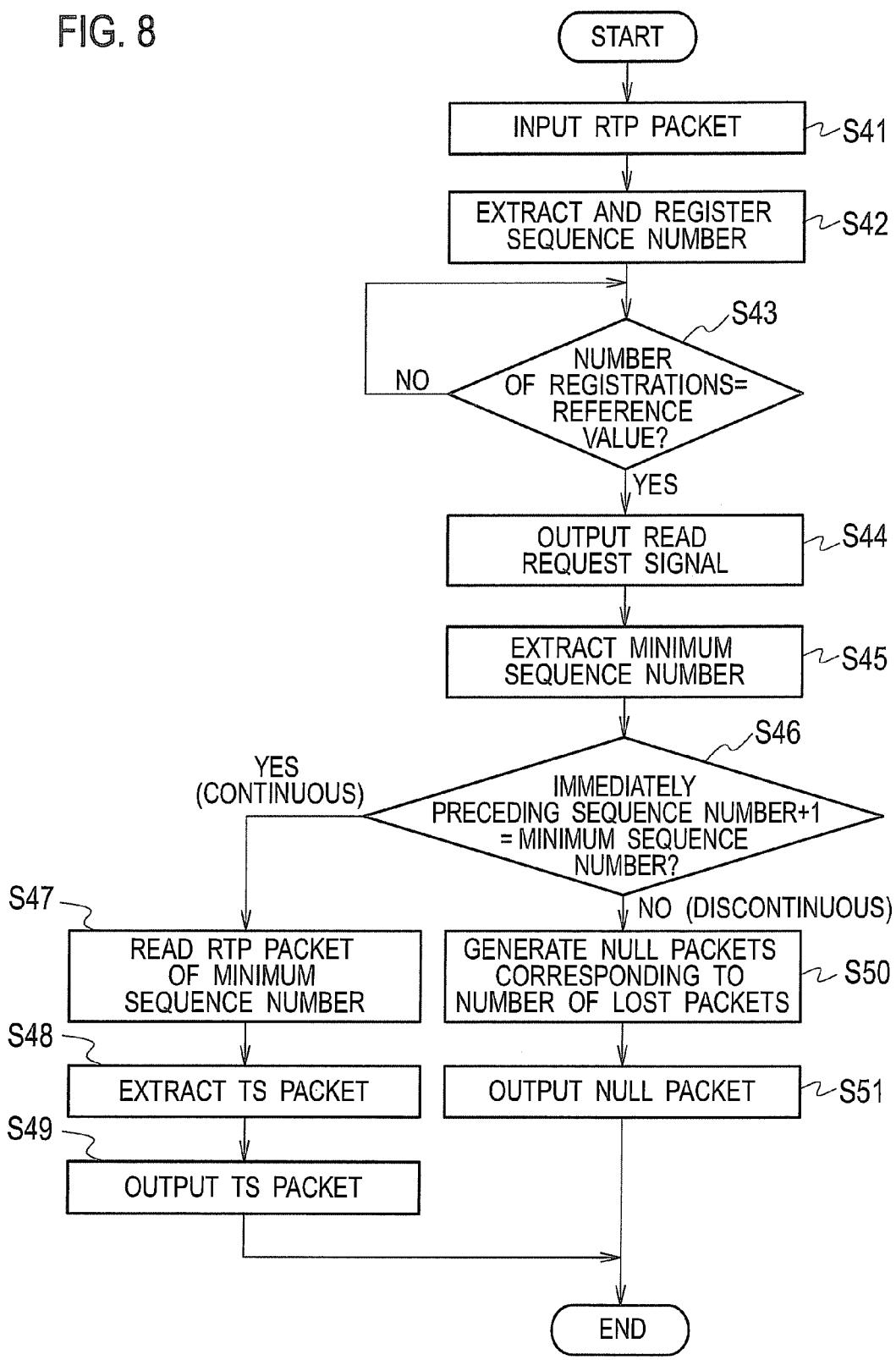

FIG. 8 is a flow chart showing an operation of the NULL packet inserter 140 in the third embodiment of the present invention. The operation of the NULL packet inserter 140 will be described below, referring to FIG. 8.

An RTP packet which has been transmitted over a network and input to the NULL packet inserter 140 is input to an RTP packet buffer 141, and simultaneously input to a sequence number extractor 142 (S41). The sequence number extractor 142 extracts a sequence number provided to the RTP packet, and registers the extracted sequence number to an RTP sequence number list buffer 143 (S42). The RTP sequence number list buffer 143 outputs the number of registrations to a number-of-registrations comparator 145. The number-of-registrations comparator 145 compares a predetermined reference value held in the reference value holder 144 with the number of registrations (S43) and, if the number of registrations has become equal to the reference value, outputs a read request signal to a minimum sequence number detector 146 (S44). Upon receiving an input read request signal, the minimum sequence number detector 146 extracts the minimum sequence number from the RTP sequence number list buffer 143 (S45). The minimum sequence number detector 146 then compares the extracted minimum sequence number with a number (immediately preceding value) output from an immediately preceding sequence number holder 147 (S46).

Here, if the minimum sequence number and the immediately preceding value are continuous (S46), the minimum sequence number detector 146 determines that no packet loss has occurred, and outputs a read signal indicating the minimum sequence number to a read-and-output unit 149 (S47). The minimum sequence number and the immediately preceding value being continuous correspond to the case where the minimum sequence number is larger than the immediately preceding value by one. Upon receiving an input read signal from the minimum sequence number detector 146, the read-and-output unit 149 reads an RTP packet from the RTP packet buffer 141 and outputs it to a TS packet extract-and-output unit 150. The TS packet extract-and-output unit 150 extracts a TS packet from an RTP packet and outputs it to an output switcher 151 (S48→S49). In addition, triggered by a read signal from the minimum sequence number detector 146, a corresponding sequence number is deleted in the RTP sequence number list buffer 143, and the minimum sequence number indicated by the read signal is overwritten as the immediately preceding value in the immediately preceding sequence number holder 147.

If, on the other hand, the minimum sequence number and the immediately preceding value is discontinuous (S46), the minimum sequence number detector 146 determines that packet loss has occurred, and outputs a discontinuous signal indicating the number of lost RTP packets to a NULL packet generator 148. The number of lost packets is calculated as the difference between the minimum sequence number and the immediately preceding number from the immediately preceding sequence number holder 147. Triggered by the reception of a discontinuous detection signal, the NULL packet generator 148 generates NULL packets corresponding to the number of lost packets and outputs them to the output switcher 151 (S50). The output switcher 151 receives inputs of the TS packet extracted from the RTP packet by the TS packet extract-and-output unit 150 and the NULL packets being output from the NULL packet generator 148. While discontinuous signals are being output from the minimum sequence number detector 146, the output switcher 151 outputs NULL packets being output from the NULL packet generator 148 (S51).

According to the output rate controller 100 in the third embodiment of the present invention, as has been described above, if packet loss has occurred during network transmission, a NULL packet is inserted in the part where the packet loss has occurred, whereby timing gap is eliminated when passing a TS packet to the decoder and decoding failure such as audio/video (AV) disturbance or synchronization error between video and audio can be prevented.

Figure 9:
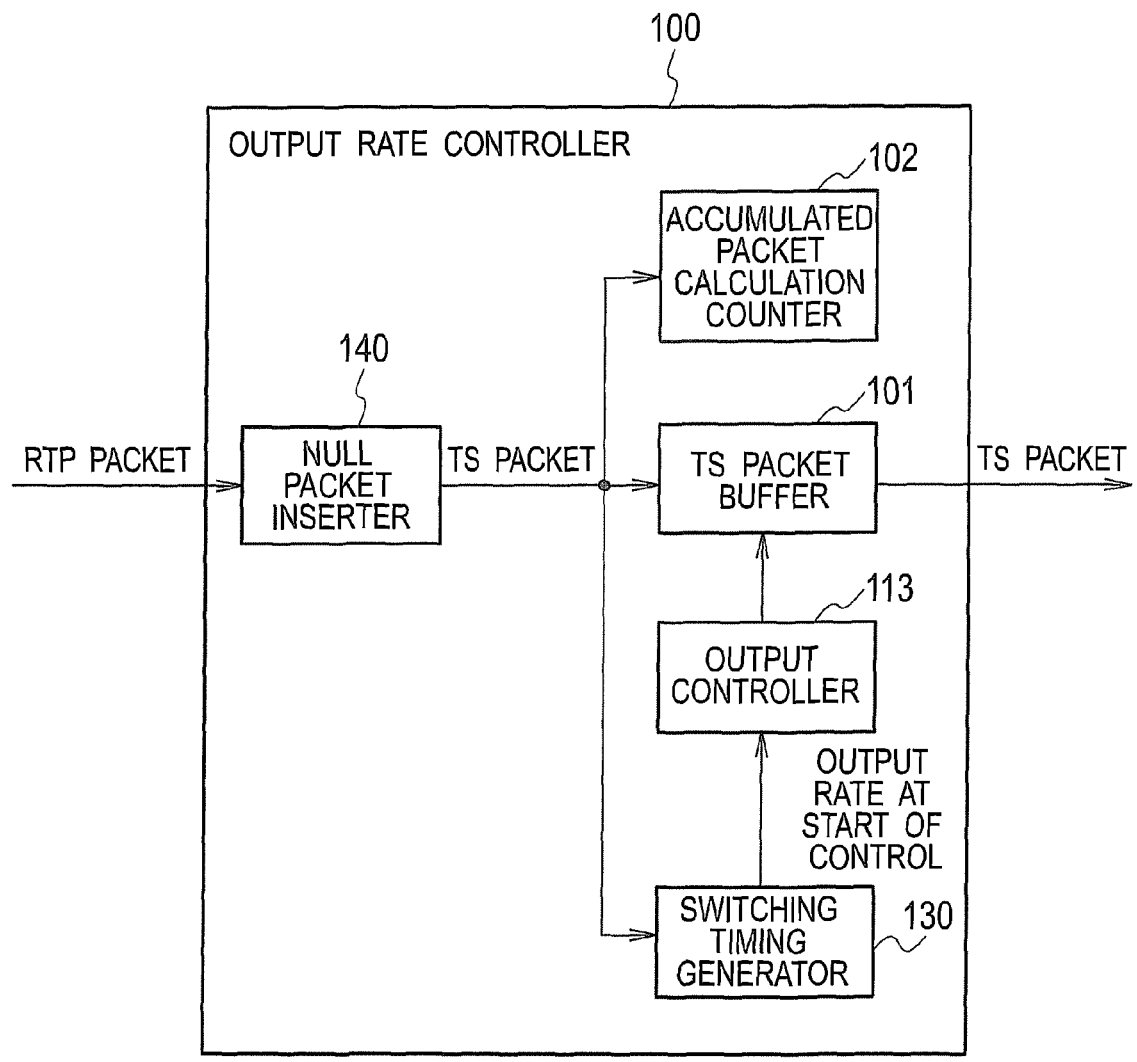

Now, the configuration of the output rate controller 100 in the present embodiment can be summarized as shown in FIG. 9. In other words, an RTP packet is input to the NULL packet inserter 140, and a TS packet is output from the NULL packet inserter 140. The TS packet which has been output in such a manner is input to the accumulated packet calculation counter 102, the TS packet buffer 101, and the switching timing generator 130. It is needless to say that the output rate controller 100 has the above-mentioned processing units (not shown) such as the maximum/minimum value detector 103.

In addition, although TS has been exemplified and explained in the first to the third embodiments, the invention is not limited thereto. For example, in the first embodiment and the third embodiment, PS (Program Stream) can be employed in place of TS.

Furthermore, the present invention can be realized not only as the output rate controller 100, but also can be realized as an output rate control method including steps of the operation of the characteristic processing unit provided in the output rate controller 100, can be realized as an output rate control program which causes a computer to perform such steps. It is needless to say that such a program can be delivered in a recording medium such as CD-ROM or a transmission medium such as the Internet.

REFERENCE SIGNS LIST

100 output rate controller
101 TS packet buffer (packet accumulator)
107 maximum value increase detector
108 minimum value decrease detector
113 output controller
140 NULL packet inserter
120 initial output rate calculator

The invention claimed is:

1. An output rate controller that controls an output rate of inputted packets, comprising:
    a packet accumulator that accumulates inputted packets;
    a maximum value increase detector that detects an increasing trend of a maximum number of packets being accumulated in the packet accumulator within a fixed time period;
    a minimum value decrease detector that detects a decreasing trend of a minimum number of packets being accumulated in the packet accumulator within the fixed time period;
    an output controller that sets a higher output rate of packets being accumulated in the packet accumulator if the increasing trend has been detected by the maximum value increase detector, and sets a lower output rate of packets being accumulated in the packet accumulator if the decreasing trend has been detected by the minimum value decrease detector;
    a voltage controlling crystal oscillator; and
    a counter that performs a counting operation for each clock signal from the voltage controlling crystal oscillator,
    wherein the output controller outputs a TS packet from the packet accumulator when a count value of the counter has reached a predetermined value $N=(Fe/Rini) \times 8 \times Lts$, where Fe is a center frequency of the voltage controlling crystal oscillator, Rini is an initial output rate, and Lts is a byte length of the TS packet.

2. The output rate controller according to claim 1, further comprising, at a preceding stage of the packet accumulator, a NULL packet inserter that generates NULL packets if packet loss has occurred, and inserts the generated NULL packets in place of lost packets.

3. The output rate controller according to claim 1, further comprising an initial output rate calculator that calculates the initial output rate to be used in the output controller, based on time difference between detecting two PCR values from the TS packet, and the number of TS packets received until the two PCR values are detected.

4. An output rate control method that controls an output rate of inputted packets, comprising:
    a packet accumulating step that accumulates inputted packets in a packet accumulator;
    a maximum value increase detecting step that detects an increasing trend of a maximum number of packets being accumulated in the packet accumulator within a fixed time period;
    a minimum value decrease detecting step that detects a decreasing trend of a minimum number of packets being accumulated in the packet accumulator within the fixed time period; and
    an output controlling step that sets a higher output rate of packets being accumulated in the packet accumulator if the increasing trend has been detected in the maximum value increase detecting step, and sets a lower output rate of packets being accumulated in the packet accumulator if the decreasing trend has been detected in the minimum value decrease detecting step,
    wherein the output controlling step outputs a TS packet from the packet accumulator when a count value of a counter, which performs a counting operation for each clock signal from a voltage controlling crystal oscillator, has reached a predetermined value $N=(Fe/Rini) \times 8 \times Lts$, where Fe is a center frequency of the voltage controlling crystal oscillator, Rini is an initial output rate, and Lts is a byte length of the TS packet.

5. The output rate control method according to claim 4, further comprising, at a preceding stage of the packet accumulating step, a NULL packet inserting step that generates NULL packets if packet loss has occurred, and inserts the generated NULL packets in place of lost packets.

6. The output rate control method according to claim 4, further comprising an initial output rate calculating step that calculates the initial output rate to be used in the output controlling step, based on time difference between detecting two PCR values from the TS packet, and the number of TS packets received until the two PCR values are detected.

7. The output rate controller according to claim 3, wherein the output controller outputs the TS packet from the packet accumulator based on a value of the initial output rate.

8. The output rate control method according to claim 6, wherein the output controlling step outputs a TS packet from the packet accumulator based on a value of the initial output rate.

* * * * *